3,274,237
A-NORPREGN-3-ENE DERIVATIVES

Edward Joseph Becker, Princeton, and Robert S. Robison, North Brunswick, N.J., assignors, by mesne assignments, to E. R. Squibb & Sons, Inc., New York, N.Y., a corporation of Delaware
No Drawing. Filed Oct. 23, 1963, Ser. No. 318,187
8 Claims. (Cl. 260—488)

This invention relates to and has for its objects the provision of new physiologically active compounds of the formulae:

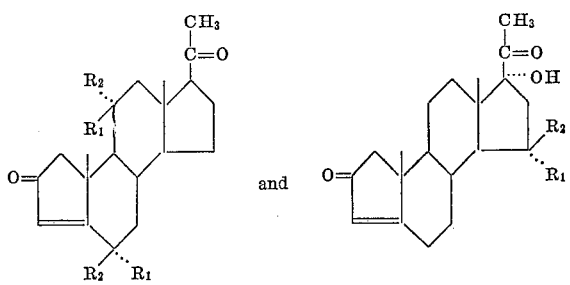

wherein $R_1$ is hydrogen, $R_2$ is selected from the group consisting of hydroxy and acyloxy and together $R_1$ and $R_2$ are oxo.

The acyl radicals preferred in the practice of this invention are those derived from hydrocarbon carboxylic acids of less than twelve carbon atoms and include such acids as the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The novel compounds of this invention are physiologically active and possess anti-androgenic activity, i.e., they inhibit the action of androgens and they may be employed in the treatment of such conditions as hyperandrogenic acne. The compounds may be formulated for such administration, the concentration and/or dosage being based on the activity of the particular compound and the requirements of the patient.

To prepare the compounds of this invention, A-norprogesterone is subected to the actions of a microorganism of the genus Aspergillus, or to the actions of the enzymes thereof, under oxidizing conditions. This oxidation can best be effected either by including A-norprogesterone in an aerobic culture of the microorganism, or by bringing together in an aqueous medium, the compounds, air and enzymes of non-proliferating cells of the microorganism.

The microorganism employed in this invention is of the genus Aspergillus and is more specifically *Aspergillus nidulans*.

In general, the conditions of culturing the Aspergillus microorganism for the purposes of this invention are (except for the inclusion of a A-norprogesterone to be converted), the same as those of culturing various other microorganisms for the production of antibiotics, Vitamin B–12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

This microbial process yields inter alia 15,17-dihydroxy A-norprogesterone and additionally, upon further processing, yields 6,11-dihydroxy-A-norprogesterone also, which compounds are new compounds of this invention.

The 15,17- and 6,11-dihydroxy compounds may then be acylated as by treatment with an acyl halide or acid anhydride of a hydrocarbon carboxylic acid of less than twelve carbon atoms, in the presence of a base, for example, pyridine to yield, respectively, the 15,17- and 6,11-diacyloxy derivatives thereof, which are also new compounds of this invention.

Alternatively, the 15,17- and 6,11-dihydroxy compounds may be oxidized as by treatment with chromic acid, to yield the 15-keto-17 hydroxy and the 6,11-diketo derivatives thereof, which are also new compounds of this invention.

The invention may be illustrated by the following examples:

EXAMPLE 1

*15β,17α-dihydroxy-A-norprogesterone*

An 800 gallon fermentor containing 608 g. of A-norprogesterone in the following fermentation media:

|   | G. |
|---|---|
| Corn steep liquor | 6 |
| $NH_4H_2PO_4$ | 3 |
| $CaCO_3$ | 2.5 |
| Soybean oil | 2.5 |
| Distilled water, to 1 liter. | | was inoculated with a culture of *Aspergillus nidulans* (ATCC No. 11267, on deposit with the American Type Culture Collection, Washington, D.C.).

After twenty-five hours of aerated fermentation, the whole broth was filtered, and the filtrate extracted with one-half volume of chloroform in a Podbielniak extractor. The chloroform solution is washed with water, dried over sodium sulfate and evaporated to a crystalline mass which weighs 564 grams. This material is dissolved in 2.5 liters of chloroform and 5 liters of benzene and chromatographed on 27.5 kg. of Merck acid-washed alumina. Elution of the column of benzene/chloroform 2:1, 1:1, 1:2 and then chloroform and a further elution of the column of chloroform/methanol, 100:1 yields about 15 grams of 15β,17α-dihydroxy-A-norprogesterone, having the following properties: M.P. 264–267° C.; $[\alpha]_D^{22}$ −28°; 21.13 mg./2 ml. MeOH $\lambda_{max.}^{EtOH}$ 234 m$\mu$; $\epsilon_{max.}$ 15,800; $\lambda_{max.}^{Nujol}$ 2.79, 2.87, 5.89 and 6.19;

Anal.—Calc'd for $C_{22}H_{28}O_4$ (332.42): C=72.26%; H=8.49%. Found: C=72.46%; H=8.33%.

EXAMPLE 2

6β,11α-dihydroxy-A-norprogesterone

Continued elution of the column in Example 1 with chloroform/methanol 75:1 yields about 30 grams of 6β,11α-dihydroxy-A-norprogesterone having the following properties: M.P. 272–275° C.; $[\alpha]_D^{24}$ +18°; 20.65 mg./2 ml. MeOH $\lambda_{max.}^{EtOH}$ 230 m$\mu$; $\epsilon_{max.}$ 12,500; $\lambda_{max.}^{Nujol}$ 2.90, 2.92, 5.89, 5.99 and 6.15$\mu$ Anal.—Calc'd for $C_{20}H_{28}O_4$ (332.42): C=72.26%; H=8.49%. Found: C=72.36%; H=8.52%.

EXAMPLE 3

15β-acetoxy-17α-hydroxy-A-norprogesterone 50 mg. of 15β,17α-dihydroxy-A-norprogesterone is dissolved in 5 ml. of pyridine and 2.5 ml. of acetic anhydride. After standing overnight the product is isolated in the usual manner to give 55 mg. of residue which is recrystallized from acetone/hexane to give 42 mg. of pure 15β-acetoxy-17α-hydroxy-A-norprogesterone, having the following properties: M.P. 161–164° C.

$\lambda_{max.}^{Nujol}$ 2.89 5.79, 5.88, 5.96 and 6.20$\mu$

EXAMPLE 4

17α-hydroxy-A-norpregn-3-ene-2,15,20-trione 55 mg. of 15β,17α-dihydroxy-A-norprogesterone is dissolved in 15 ml. of acetone and six drops of 8 N chromic acid (Jones reagent) is added. After one-half hour the product is isolated in the usual manner to give 63 mg. of crude neutral product. The acid fraction from the oxidation gives 15 mg. Recrystallization of the neutral fraction from acetone/hexane gives 30 mg. of pure 17α-hydroxy-A-norpregn-3-ene-2,15,20-trione, having the following properties: M.P. 265–268° C.

$\lambda_{max.}^{EtOH}$ 233 m$\mu$; $\epsilon_{max}$ 16,700; $\lambda_{max.}^{Nujol}$ 2.92, 5.79, 5.89, 5.98 and 6.19$\mu$

EXAMPLE 5

6β,11α-diacetoxy-A-norprogesterone 102 mg. of 6β,11α-dihydroxy-A-norprogesterone is dissolved in 10 ml. pyridine (with heat) and 5 ml. of acetic anhydride. After standing overnight the product is worked up in the usual manner to give 141 mg. of the crude diacetate. Recrystallization from acetone/hexane gives 91 mg. of 6β,11α-diacetoxy-A-norprogesterone, having the following properties: M.P. 120–122° C. and 157–160° C.; $[\alpha]_D^{22}$ +59°; 20.53 mg./2 ml. CHCl$_3$ $\lambda_{max.}^{EtOH}$ 229 m$\mu$; $\epsilon_{max.}$ 13,300; $\lambda_{max.}^{Nujol}$ 5.76, 5.82 5.88 and 6.11$\mu$

EXAMPLE 6

A-norpregn-3-en-2,6,11,20-tetrone 101 mg. of 6β,11α-dihydroxy-A-norprogesterone is dissolved in 60 ml. of acetone. The solution is treated with twelve drops of 8 N chromic acid (Jones reagent). After one-half hour the solution is diluted with water, extracted with 3 x ⅓ volumes of chloroform. The usual workup gives a crude product of 112 mg. Recrystallization from acetone/hexane gives the pure A-norpregn-3-en-2,6,11,20-tetrone, having the following properties: M.P. 225–228° C.; $[\alpha]_D^{25}$ +135°; 19.82 mg./2 ml. CHCl$_3$ $\lambda_{max.}^{EtOH}$ 238 m$\mu$; $\epsilon_{max.}$ 10,000; $\lambda_{max.}^{1\% KOH}$ 248 m$\mu$; $\epsilon_{max.}$ 6,600; 362 m$\mu$; $\epsilon_{max}$ 5,000; $\lambda_{max.}^{Nujol}$ 5.86, 5.91 and 6.20$\mu$.

The invention may be variously otherwise embodied within the scope of the appended claims.

What is claimed is:

1. A compound selected from the group consisting of steroids of the formulae:

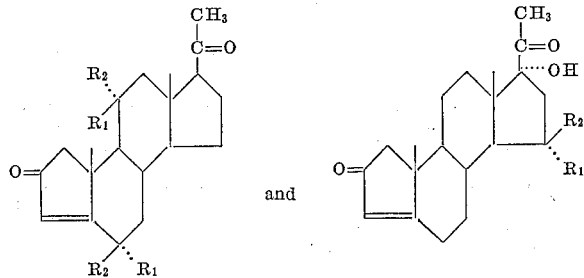

and wherein $R_1$ is hydrogen, $R_2$ is selected from the group consisting of hydroxy and the acyloxy radical of a hydrocarbon carboxylic acid of less than twelve carbon atoms and together $R_1$ and $R_2$ are oxo.

2. 15β, 17α-dihydroxy-A-norprogesterone.
3. 6β,11α-dihydroxy-A-norprogesterone.
4. 15β-acetoxy-17α-hydroxy-A-norprogesterone.
5. 17α-hydroxy-A-norpregn-3-ene-2,15,20-trione.
6. 6β,11α-diacetoxy-A-norprogesterone.
7. A-norpregn-3-en-2,6,11,20-tetrone.
8. A compound of the formula

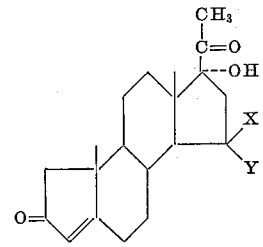

wherein X is hydrogen; Y is selected from the group consisting of hydroxy and the acyloxy radical of a hydrocarbon carboxylic acid of less than twelve carbon atoms and together X and Y is oxo (O=).

References Cited by the Examiner
UNITED STATES PATENTS

| | | | |
|---|---|---|---|
| 2,649,402 | 8/1953 | Murray | 195—51 |
| 2,672,466 | 3/1954 | Murray et al. | 260—397.45 |
| 2,989,439 | 6/1961 | Weaver | 195—51 |
| 3,040,091 | 6/1962 | Weisenborn | 260—488 |
| 3,060,230 | 10/1962 | Kubota | 260—488 |
| 3,143,480 | 8/1964 | Laskin et al. | 260—586 |
| 3,170,919 | 2/1965 | Fried | 260—586 |

LORRAINE A. WEINBERGER, Primary Examiner.

LEON ZITVER, Examiner.

D. P. CLARKE, V. GARNER, Assistant Examiners.